Figure 1:
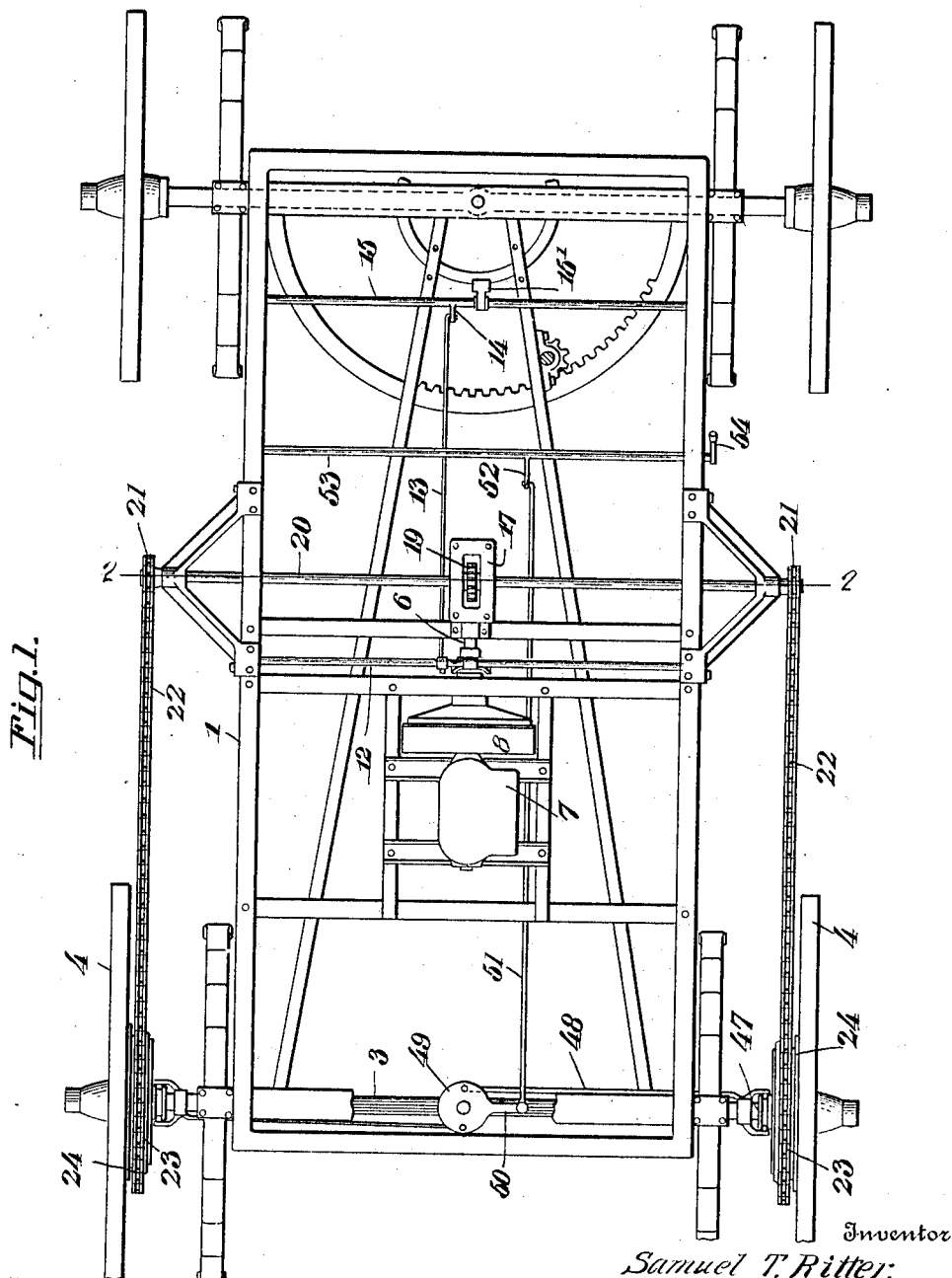

S. T. RITTER.
AUTOMOBILE DRIVE GEARING.
APPLICATION FILED DEC. 23, 1910.

1,048,345.

Patented Dec. 24, 1912.
2 SHEETS—SHEET 1.

Witnesses
F. C. Gibson.
C. C. Hines.

Inventor
Samuel T. Ritter.
By Victor J. Evans
Attorney

S. T. RITTER.
AUTOMOBILE DRIVE GEARING.
APPLICATION FILED DEC. 23, 1910.
1,048,345.
Patented Dec. 24, 1912.
2 SHEETS—SHEET 2.
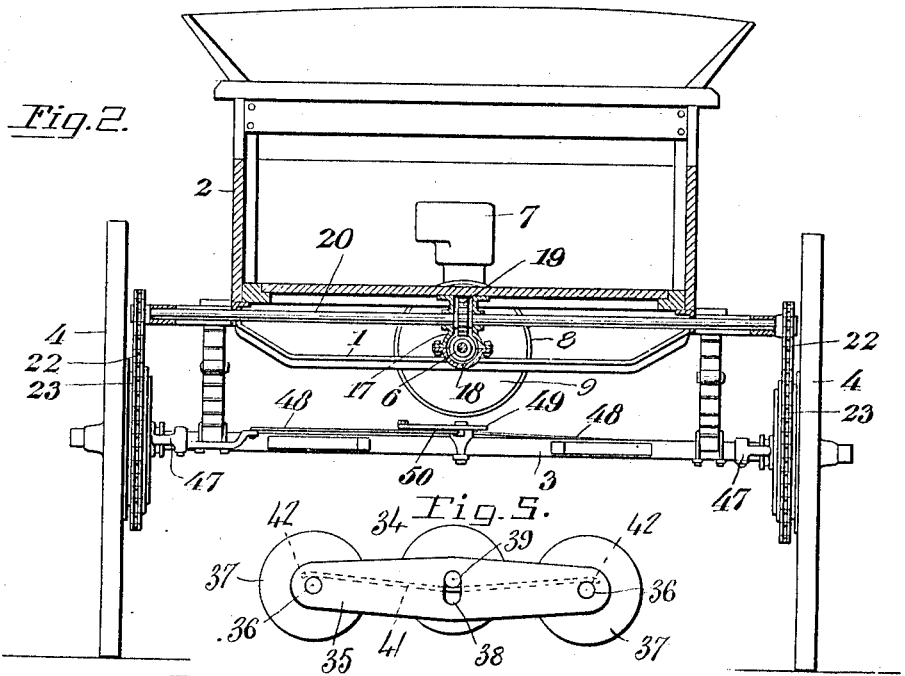
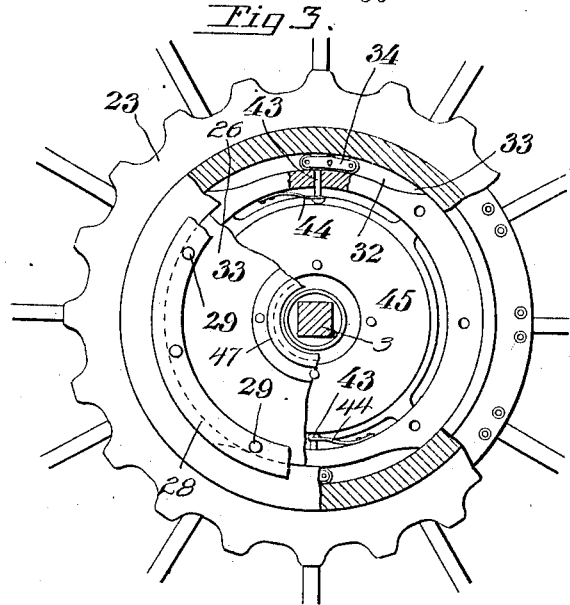
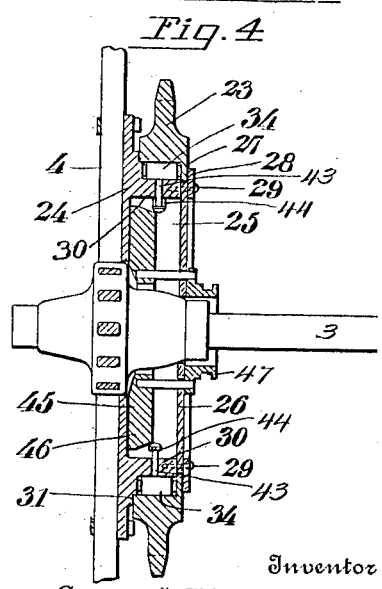
Inventor
Samuel T. Ritter.
Witnesses
F. C. Gibson
C. C. Hines
By Victor J. Evans
Attorney

UNITED STATES PATENT OFFICE.

SAMUEL T. RITTER, OF OREFIELD, PENNSYLVANIA.

AUTOMOBILE DRIVE-GEARING.

1,048,345.     Specification of Letters Patent.     Patented Dec. 24, 1912.

Application filed December 23, 1910. Serial No. 598,896.

*To all whom it may concern:*

Be it known that I, SAMUEL T. RITTER, a citizen of the United States, residing at Orefield, in the county of Lehigh and State of Pennsylvania, have invented new and useful Improvements in Automobile Drive-Gearing, of which the following is a specification.

This invention relates to drive gearing for motor-driven vehicles, and its object is to provide a simple and effective type of clutch-controlled drive gearing operative for running the vehicle either forward or backward or to permit the driving wheels to run free for coasting, and which is also operative to lock the driving wheels against rotation in order that the vehicle may be brought to a quick stop when occasion requires.
The invention consists of the features of construction, combination and arrangement of parts, hereinafter fully described and claimed, reference being had to the accompanying drawings, in which:—
Figure 1 is a top plan view, showing the running gear of a motor-vehicle constructed in accordance with my invention. Fig. 2 is a transverse section on the line 2—2 of Fig. 1. Fig. 3 is an inner side elevation of one of the driving wheels with parts removed. Fig. 4 is a vertical transverse section through the same. Fig. 5 is a detail view of one of the roller ratchets.

Referring to the drawings, 1 designates the base frame or chassis of the vehicle; 2, the body of the vehicle; 3, the rear axle; 4, the rear driving wheels journaled thereon; 5 and 6 sections of the main drive shaft adapted to be connected and disconnected by a suitable clutch device; and 7 the motor suitably mounted upon the body and arranged to impart driving motion to the shaft section 5.

The front end of the shaft section 6 is journaled and slidably mounted in a suitable bearing frame or casing 17 and carries a drive gear 18 which meshes with a gear 19 on a transverse shaft 20 carrying at its ends sprocket pinions 21 connected by transmission chains 22 with sprocket gears 23 associated with the respective driving wheels 4. Each driving wheel has bolted or otherwise fixed thereto a clutch member 24, which is inclosed by the sprocket gear 23. The clutch member 24 has a central circular channel or recess 25 closed at its inner side by a plate 26, against which plate bears an annular flange 27 on the inner side of the inner periphery of the gear 23, said flange being lapped or engaged by a retaining ring 28 secured with the plate 26 to the clutch member by screws 29, the gear being arranged to revolve about an annular friction surface or flange 30 carried by said clutch member and between said retaining ring and an annular shoulder 31 on the clutch member, whereby the gear is held in position against lateral displacement.

The outer face of the friction flange 30 of the clutch member 24 is provided at diametrically opposite sides with peripheral recesses 32 having beveled or inclined end portions 33, the remainder of the periphery of said friction flange being truly concentric with the axis of the wheel and snugly fitting the internal periphery of the gear 23. By this construction channeled runways are formed between the gear 23 and the walls of the recesses 32, within which runways are arranged for operation shiftable clutch elements 34, which may be termed roller ratchets. Each of these devices consists of a pair of parallel side plates 35 connected by transverse end pins 36 on which are revolubly mounted bearing rollers 37. Between the pins 36 the plates 35 are formed with vertical slots 38 receiving the ends of a central transverse pin 39 carrying a transverse friction roller 40. The ends of the pin 39 project beyond the side plates and are engaged by longitudinally curved ribbon springs 41 having hooked ends 42 engaging the projecting ends of the pin 36. The roller 40 is pressed by the springs in contact with the surface of the gear 23 to establish sufficient friction to prevent undue freedom of motion of the movable clutch member or ratchet roller, while the rollers 37 permit said clutch members to run freely enough for an easy action of the parts.

The function of the movable clutch members or roller ratchets is to form connections between the driving gears 23 and the driving wheels, through the clutch members 24, to connect the driving wheels with the gearing for either forward or backward propelling motion or to release the parts to permit the wheels to run free in coasting, etc., said clutch members being further designed to lock the driving wheels against motion under certain contingencies of service. When the gears 23 move forward in starting the engine for a forward driving action, the roller ratchets are shifted automatically by friction and gravity to lock the wheels to the gearing for a forward drive motion, the upper roller ratchet moving into the contracted space between the front beveled surface 33 and the surface of the gear 23, while the lower ratchet roller moves into the contracted space between the rear beveled surface 33 of the lower recess and the surface of the gear 23. On the other hand, when the drive gearing is shifted for a backward propelling action the roller ratchets move toward the opposite ends of the runways from those previously described and lock the gears 23 to the clutch members 20 for a positive backward propelling motion. When the vehicle is in motion and the driving gearing is thrown out of action suddenly by means of the clutch member 9, as when the danger of a collision exists, the cessation of motion of the gears 23 brings the ratchet rollers into interlocking engagement with the clutch surfaces 30 in such a manner as to lock the driving wheels against rotation, thus bringing the vehicle to a quick stop.

A mechanism is provided for rendering the clutch devices 34 inoperative in order to permit free movement of the wheels for coasting when the driving gear 18 is disconnected from the engine. Such mechanism comprises a pair of stop pins 43 slidable through the flange 30, the inner ends of said pins being beveled and projecting into the recess 25, while the outer ends thereof are adapted to be projected outwardly into the runways 32 between the inclined ends thereof, each pin being normally held retracted by a spring 44. Arranged within the recess 25 is a ring 45 having a tapered or conical outer face 46 which engages the beveled inner ends of the pins, said cone being movable inwardly to project the pins into the runways and outwardly to free said pins for retraction. The cones of the two driving wheel clutches are connected with sliding collars 47 which are coupled by links 48 with a cam or eccentric disk 49 on the rear axle. This disk is provided with an arm 50 connected by a link 51 with a crank arm 52 on a transverse shaft 53 with which is connected a lever 54, whereby the cones may be simultaneously adjusted to project or retract the stop pins. When the drive gearing is thrown out of action, the motion of the drive gears arrested and the stop pins projected, the continued motion of the wheels and clutch members 24 will shift the clutch members 34 to a neutral position, beyond which they will be prevented from moving by the stop pins. By such position the members 34 lie between their locking and cam engaging positions and thus remain inoperative, allowing the wheels to turn freely on their axle spindles.

From the foregoing description, taken in connection with the accompanying drawings, the construction, mode of operation and advantages of my improved drive gearing will be readily understood, and it will be apparent that such type of gearing may be employed with manifold conveniences upon automobiles of different types and without the necessity of altering the frame structure in any material way.

Having thus described my invention, I claim:—

1. In an automobile drive gearing, a drive wheel, relatively stationary and movable clutch members on said drive wheel, one of said members constituting a gear element and said members being provided with runways having contracted ends, wheeled clutch elements movable in said runways for automatically coupling and uncoupling said clutch members, means independent of and auxiliary to said clutch members for positively locking the wheeled clutch elements from shifting movement, and means for manually throwing said locking means into and out of action.

2. In an automobile drive gearing, a drive wheel, relatively stationary and movable clutch members on said driving wheel, one of said members constituting a gear element and said members being provided with runways having contracted ends, wheeled clutch elements movable in said runways for automatically coupling and uncoupling said clutch members, radially movable stop devices for holding the wheeled clutch elements from shifting movement, means for projecting said stop devices, and means for retracting the same.

3. In an automobile drive gearing, a drive wheel, relatively stationary and movable clutch members on said wheel, one of said members constituting a gear element and said members being provided with runways having contracted ends, wheeled clutch elements movable in said runways for automatically coupling and uncoupling said clutch members, automatically-retracted radially movable stop members for holding said wheeled clutch elements from shifting movement, movable devices for projecting said stop members, and means for operating said devices.

4. In an automobile drive gearing, a drive wheel, relatively stationary and movable clutch members carried thereby, one of said members constituting a gear element, and said members being provided with runways having contracted ends and intermediate cam surfaces, wheeled clutch elements movable in said runways for engagement with said contracted ends and cam surfaces, spring-retracted radially movable stop pins for holding said wheeled clutch elements from shifting movement, and means for projecting said pins.

In testimony whereof I affix my signature in presence of two witnesses.

SAMUEL T. RITTER.

Witnesses:
W. S. SCHELHAMER,
EDGAR J. KLOTZ.

Copies of this patent may be obtained for five cents each, by addressing the "Commissioner of Patents, Washington, D. C."